US008215141B2

(12) United States Patent
Yi et al.

(10) Patent No.: US 8,215,141 B2
(45) Date of Patent: Jul. 10, 2012

(54) CODE CHANGING MECHANISM FOR A MECHANICAL COMBINATION LOCK

(75) Inventors: Jianhua Yi, Yue Yang Xian (CN); Ming Chen, Foshan (CN)

(73) Assignee: Kin Kei Hardware Industries Limited, Tai Koo (HK)

( * ) Notice: Subject to any disclaimer, the term of this patent is extended or adjusted under 35 U.S.C. 154(b) by 0 days.

(21) Appl. No.: 13/196,832

(22) Filed: Aug. 2, 2011

(65) Prior Publication Data

US 2012/0131968 A1 May 31, 2012

(30) Foreign Application Priority Data

Nov. 25, 2010 (CN) ...................... 2010 2 0631828 U

(51) Int. Cl.
*B60R 25/02* (2006.01)
*B62H 5/04* (2006.01)
*E05B 13/10* (2006.01)
*F16C 3/00* (2006.01)
*G05G 5/00* (2006.01)

(52) U.S. Cl. .................. 70/214; 70/21; 70/284; 70/285; 70/313; 70/287; 70/288; 70/DIG. 44

(58) Field of Classification Search .............. 70/21, 284, 70/285, 214, 297, 298, 299, 300, 313, 287, 70/288, DIG. 44
See application file for complete search history.

(56) References Cited

U.S. PATENT DOCUMENTS

| | | | | |
|---|---|---|---|---|
| 6,298,698 | B1 * | 10/2001 | Nakajima et al. | 70/214 |
| 6,334,346 | B1 * | 1/2002 | Wang | 70/214 |
| 6,575,004 | B2 * | 6/2003 | Berton et al. | 70/313 |
| 7,043,948 | B1 * | 5/2006 | Wang | 70/214 |
| 7,318,331 | B2 * | 1/2008 | Miao | 70/214 |
| 2008/0115546 | A1 * | 5/2008 | Hu | 70/214 |
| 2008/0216531 | A1 * | 9/2008 | Waller et al. | 70/298 |

* cited by examiner

*Primary Examiner* — Lloyd Gall
*Assistant Examiner* — David E Sosnowski
(74) *Attorney, Agent, or Firm* — Intellectual Property Law Group LLP

(57) ABSTRACT

A code changing mechanism for a mechanical combination lock, comprises function keys; two rows of code number keys on the lock body; a code-changing rack; an intermediate gear; a code-changing lock core with keyhole; and gear modules connected with each code number key, each gear module comprises a code-changing gear and controlling chip. There is a groove for resetting code provided on the gear; the chip inserted in the groove forming a code reset site; a code free site provided between the chip and gear; a left and a right straight rack; and the rack engages with a corresponding row of code-changing gears. The lock core coaxially connects with the intermediate gear, the intermediate gear engages with two opposing code-changing gears thereof. A movable sheet is under each of the keys. The code is changeable without disassembling any component, making the mechanism convenient, swift, flexible, reliable, with robust anti-crack capability.

4 Claims, 5 Drawing Sheets

CODE CHANGING MECHANISM FOR A MECHANICAL COMBINATION LOCK

CROSS-REFERENCE TO RELATED APPLICATION

This application claims priority to China application no. 201020631828.4 filed on Nov. 25, 2010, which is hereby incorporated by reference in its entirety.

FIELD OF THE INVENTION

The present invention relates to combination lock technology, and in particular code changing mechanisms for mechanical combination locks.

BACKGROUND OF THE INVENTION

At present, secrecy performance of commonly used mechanical combination locks is weak, and it is troublesome during the code changing.

For example, the lock needs to be disassembled for code changing while changing a single code key in conventional code changing manner, therefore it is very troublesome. Especially with regard to the code changing mechanism of the mechanical combination lock with vast code information, the structure is more complex, so it is easy to break down and service lift is not long. Moreover, capability of preventing code cracking of conventional mechanical combination lock is not robust enough, and it is easily cracked by a thief.

SUMMARY OF THE INVENTION

An object of the present invention is to provide a code changing mechanism for a mechanical combination lock, by which the code can be changed without disassembling any component. The mechanism thus allows for the convenient, swift, flexible and reliable exchanging of codes.

A further object is to efficiently prevent cracking of lock code via the gap between keys by external force, so as to enhance the anti-crack capability.

The object of the present invention is implemented via the following technical solution.

A code changing mechanism for a mechanical combination lock is provided, comprising function keys and two rows of code number keys provided on the combination lock body, wherein the function keys comprises a reset key, characterized in that, said code changing mechanism further comprises a code changing rack, an intermediate gear, a code changing lock core provided with a code changing keyhole, and code changing gear modules connected with each code number key, wherein each code changing gear module comprises a code changing gear and a code controlling chip; a groove for resetting code is provided on the code changing gear; the code controlling chip is inserted in the groove of the code changing gear to form a code reset site, and a code free site is also provided between the code controlling chip and the code changing gear; a left straight rack and a right straight rack with left and right tips opposite each other are arranged on the code changing rack, and the left straight rack and the right straight rack on the code changing rack engage with a corresponding row of code changing gears, respectively; the code changing lock core coaxially connects with the intermediate gear, and the intermediate gear engages with two opposing code changing gears thereof.

Preferably the code changing gear may be formed as a whole with a gear and coaxial cylinders connected to both end surfaces of the gear, and a stepped coaxial hole is provided on the code changing gear; said groove is provided in the cylinder on one end of the code changing gear; a barrel-shaped stepped rotary shaft is coaxially provided in the stepped coaxial hole of the code changing gear, and a slot is provided on the stepped rotary shaft at one end corresponding to the groove, width of the groove equals to width of the slot on the stepped rotary shaft; an upper protrusion and a lower protrusion apart from each other with a spacing distance are provided on both sides of the code controlling chip, and thickness of either of the upper protrusions and the lower protrusions is smaller than the width of the groove on the code changing gear; and the code controlling chip is installed in a cavity of the stepped rotary shaft, and the lower protrusions on both sides of the code controlling chip are able to be inserted into the groove.

Preferably a movable anti-crack steel code sheet may be provided under each of said function keys and said two rows of code number keys, wherein key holes corresponding to the code number key holes and the function key holes on the panel are provided on the movable steel sheet, and each key hole is communicatively connected with a locking groove, width of which is smaller than width of each key; a row of individual key holes connect with each other via the corresponding locking grooves, and the steel sheet is movable.

Compared to the prior art, embodiments of the present invention possess the following advantages.

According to an embodiment of the present invention, the code changing mechanism for changing the code is provided in the combination lock body. The conventional code changing manner that the lock needs to be disassembled while changing the code of single key is improved to the present code changing manner outside the lock.

Without any tools, and without disassembling the lock, the code can be changed to any desired one by clockwise rotating the affiliated special key of the lock with a certain degree in the code changing keyhole, thus the code changing mechanism of the present invention is convenient, swift, flexible and reliable.

When provided in the combination lock, the anti-crack steel code sheet is a movable sheet provided under the keys. Thus when external forces rotate the handle knob of the lock, all the keys will be locked by the anti-crack steel code sheet and cannot be pressed down. This efficiently prevents a thief from cracking the lock code by external force applied via the gaps of the keys.

BRIEF DESCRIPTION OF THE DRAWINGS

Details of the code changing mechanism of the mechanical combination lock according to embodiments of the present invention are described with reference to figures as below.

DETAILED DESCRIPTION OF SPECIFIC EMBODIMENTS

Figure 1:
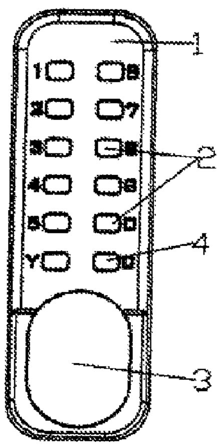
FIG. 1 is a front view of a mechanical combination lock using a code changing mechanism according to an embodiment of the present invention.
Figure 2:
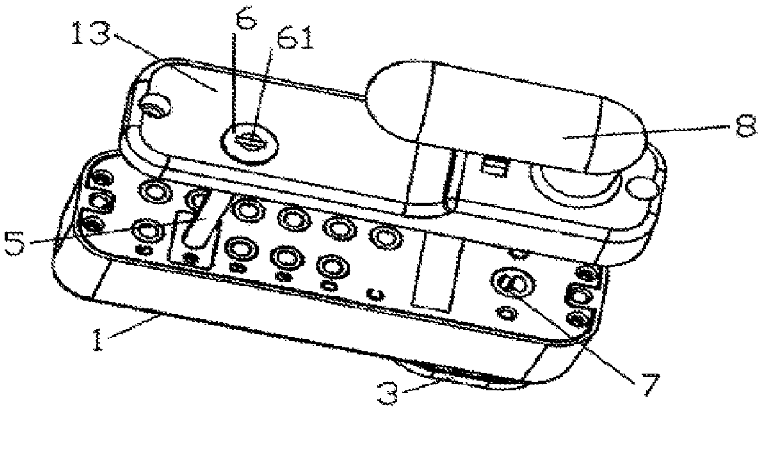
FIG. 2 is a decomposition diagram of FIG. 1.

As shown in FIGS. 1 to 2, the mechanical combination lock using the code changing mechanism according to an embodiment of the present invention commonly comprises a combination lock body and affiliated components.

A handle knob 3 is provided on an outside panel 1 of the combination lock body, and an inner handle knob 8 and a main pin seat 7 are provided on an inside cover plate 13 of the combination lock body. Function keys and two rows of code number keys 2 are provided on the combination lock body.

The inside cover plate 13, the outside panel 1 and a side wall of lock cavity form a lock cavity of the combination lock body. The outside panel 1 connects with front end of the side wall of the lock cavity; while the inside cover plate 13 is fixed on the back end of the side wall of the lock cavity.

A base plate 14 is provided in the lock cavity. The outside panel 1 is provided with two rows of code number key holes and function key holes, wherein said code number keys are arranged in the code number key holes of the outside panel 1, and said function keys are arranged in the function key holes of the outside panel 1. The function keys comprise a reset key 4. There is a handle knob hole provided on the outside panel 1, and the handle knob 3 is installed in the handle knob hole on the outside panel 1.

As shown in FIGS. 3 to 6, the code changing mechanism according to an embodiment of the present invention comprises a code changing rack 12, an intermediate gear 5, a code changing lock core 6 with a code changing keyhole, code changing gear modules connected with each code number key 2.

Each code changing gear module comprises a code changing gear 10 and a code controlling chip 9. A groove 101 for resetting code is provided on the code changing gear 10. The code controlling chip 9 is inserted into the groove 101 of the code changing gear 10 to form a code resetting site. There is also a code free site provided between the code controlling chip 9 and the code changing gear 10.

Figure 3:
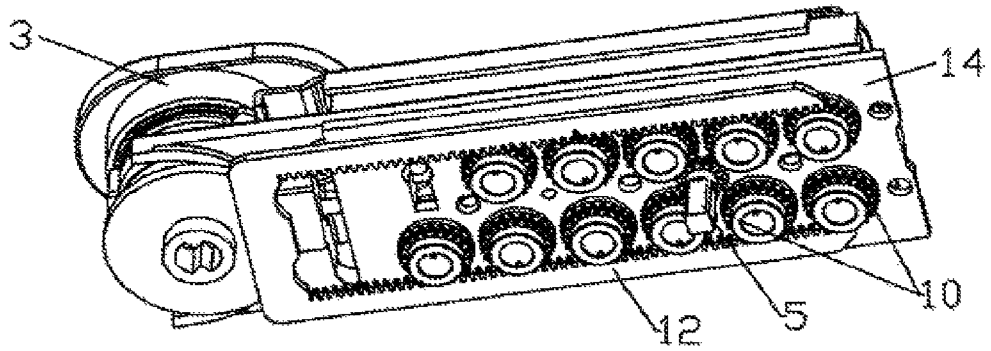
FIG. 3 is a structural diagram of the code changing mechanism of the mechanical combination lock according to an embodiment of the present invention.
Figure 4:
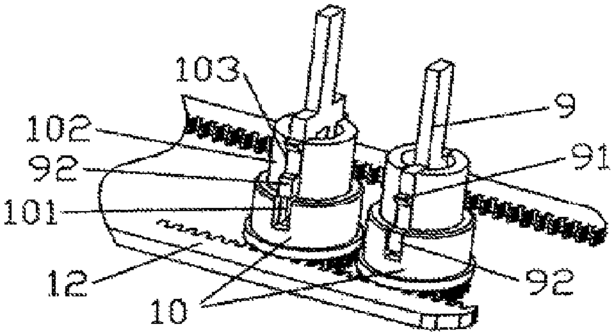
FIG. 4 is a structural diagram I of a code changing gear module of the code changing mechanism of the mechanical combination lock according to an embodiment of the present invention.
Figure 5:
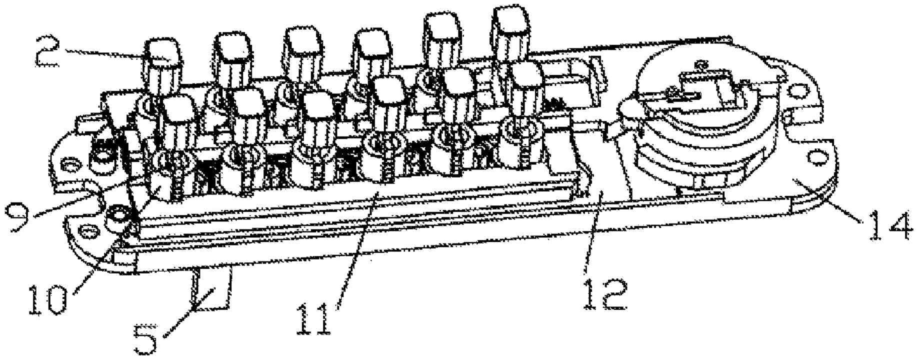
FIG. 5 is a structural diagram II of the code changing gear module of the code changing mechanism of the mechanical combination lock according to an embodiment of the present invention.
Figure 6:
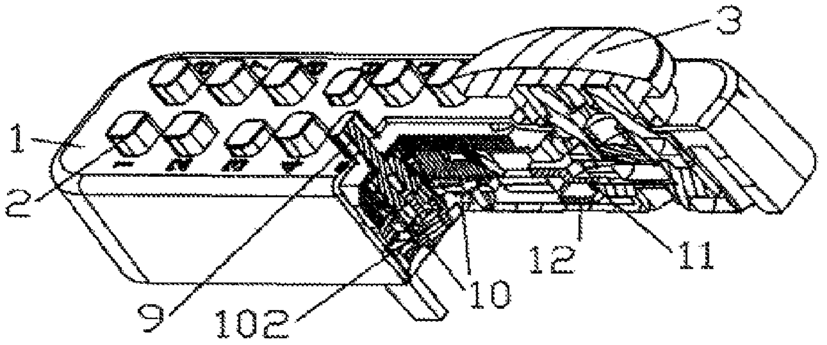
FIG. 6 is a sectional structural diagram of the code changing mechanism of the mechanical combination lock according to an embodiment of the present invention.

In FIG. 3, a left straight rack and a right straight rack with left and right tips opposite each other are arranged on the code changing rack 12. The left straight rack and the right straight rack on the code changing rack 12 engage with a corresponding row of code changing gears, respectively.

The code changing lock core 6 coaxially connects with the intermediate gear 5, and the intermediate gear 5 engages with two opposing code changing gears thereof.

The code changing gear 10 is formed by a gear and a plurality of coaxial cylinders which are connected to the gear on both surface sides of the gear. A stepped coaxial hole is provided on the code changing gear. The abovementioned groove 101 is provided as a direct access through the wall of the cylinder on one edge side of the code changing gear 10.

A barrel-shaped stepped rotary shaft 102 is coaxially provided in the stepped coaxial hole of the code changing gear. A slot 103 is provided on the stepped rotary shaft 102 at one end corresponding to the groove 101, i.e. the groove 101 and the slot 103 are located at the same side or the same end.

The width of the groove 101 on the code changing gear 10 equals to that of the slot 103 on the stepped rotary shaft 102. The code controlling chip 9 is installed in the cavity of the stepped rotary shaft 102.

An upper protrusion 91 and a lower protrusion 92 apart from each other are provided on both sides of the code controlling chip 9, and the thickness of the two protrusions on both sides of the code controlling chip 9 is smaller than the width of the groove 101 on the code changing gear 10.

When the lower protrusions 92 on two sides of the code controlling chip 9 are inserted into the groove 101 on the code changing gear, the code controlling chip 9 and the code changing gear 10 can rotate simultaneously.

When the lower protrusions 92 of the code controlling chip 9 are separated from the groove 101 on the code changing gear, the code controlling chip 9 and the stepped rotary shaft 102 can rotate simultaneously, while the code changing gear 10 does not rotate.

There is also a push plate 11 provided above the code changing rack 12. Concave stages corresponding to the lower protrusions 92 of each code controlling chip 9 are provided on the push plate 11. Once the lower protrusions 92 of the code controlling chip 9 rise up to the concave stages, the push plate 11 will be able to push the code changing gear 10 to rotate.

Figure 7:
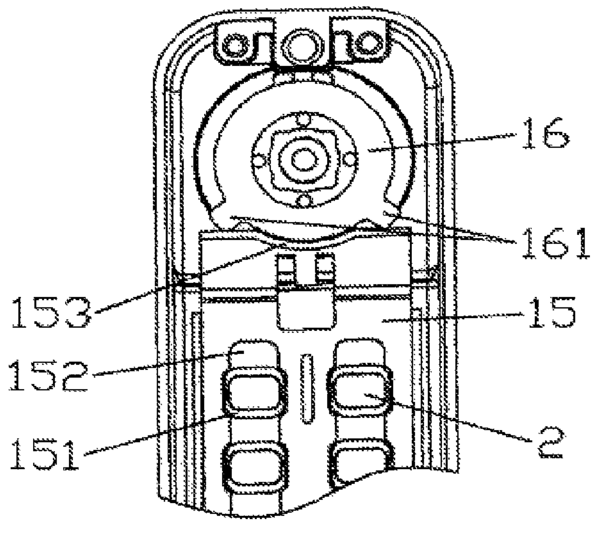
FIG. 7 is a structural diagram I of an anti-cracking steel code sheet of the code changing mechanism of the mechanical combination lock according to an embodiment of the present invention.
Figure 8:
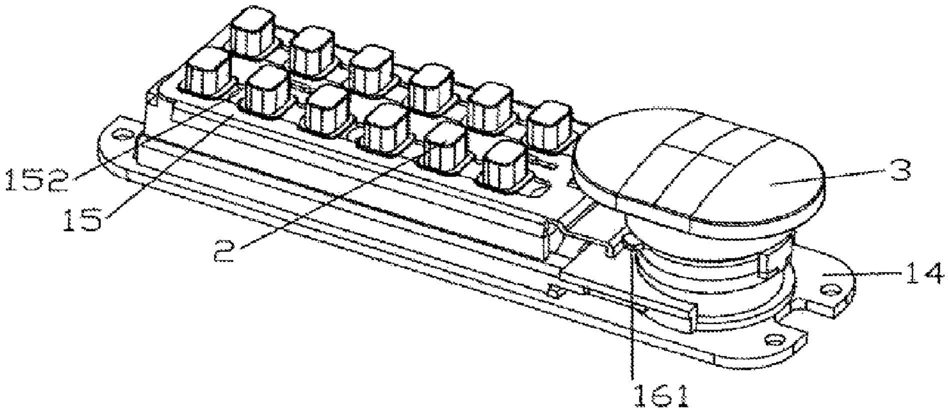
FIG. 8 is a structural diagram II of the anti-cracking steel code sheet of the code changing mechanism of the mechanical combination lock according to an embodiment of the present invention.
Figure 9:
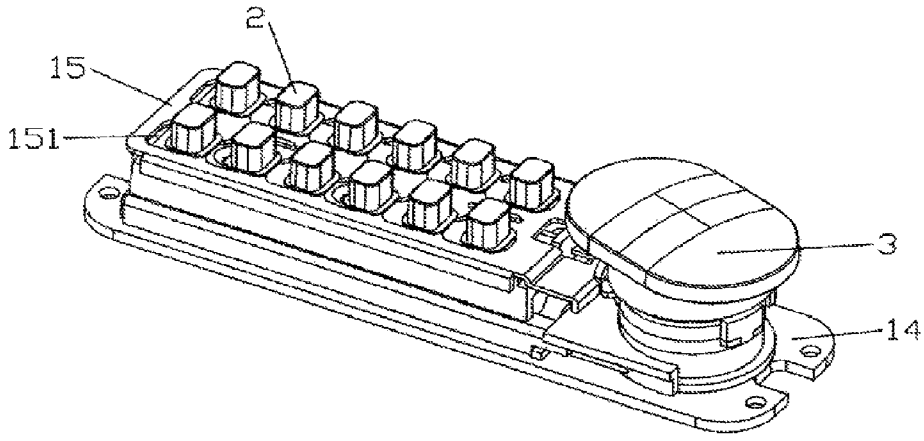
FIG. 9 is a structural diagram III of the anti-cracking steel code sheet of the code changing mechanism of the mechanical combination lock according to an embodiment of the present invention.

As shown in FIGS. 7 to 9, preferably an anti-crack steel code sheet is also provided in the combination lock body according to an embodiment of the present invention. The anti-crack steel code sheet is a movable sheet 15, which is installed under the function keys and the two rows of code number keys 2. Key holes 151 corresponding to the code number key holes and function key holes on the panel are provided on the movable sheet 15, and each key hole 151 is communicatively connected with a locking groove 152.

The width of the locking groove 152 is smaller than the width of each key 2. A row of individual key holes connect with each other via the corresponding locking grooves connected with each key hole.

A cylinder 16 is provided at the root of the handle knob, and two convex parts 161 are provided on the cylinder. A circular-arc surface 153 is provided on one end of the movable sheet 15. An axis of the cylinder 16 at the root of the handle knob coincides with the centerline of the circular-arc surface on the movable sheet 15.

The code changing procedure of the code changing mechanism of the mechanical combination lock according to an embodiment of the present invention comprises:

I) open the lock, input the code set in the combination lock correctly, rotate the handle knob 3, then the lock is open;

II) close the door, which is not limited by the lock;

III) change the code: 1) input the correct old code; 2) insert the code changing key affiliated with the lock into the code changing keyhole 61 on the back, rotate for 270° in a clockwise direction; 3) input a new code; 4) rotate the code changing key in an anticlockwise direction (return to the original position and draw out the key), then code change is completed.

As shown in FIG. 3, specific action principles of inserting the special key affiliated with the lock into the code changing keyhole 61, inputting the old code, and then resetting a new code comprise as follows:

I) Once the correct existing code is inputted, the code controlling chip 9 is inserted into the groove of the code changing gear 10;

II) The code changing key 6 is rotated to drive the code changing rack 12 via the intermediate gear 5, thus the code changing gear 10 is rotated (0°-270°) under drive of the rack 12, and the code controlling chip 9 returns to the code free site.

III) After the reset key 4 is pressed down, all the code keys of the lock to are at the code free site;

IV) A new code is inputted, so as to make the code controlling chip 9 being re-inserted into the code changing gear 10 according to the site of the inputted code;

V) The code changing key 6 is rotated to drive the code changing rack 12 via the intermediate gear 5, thus the code changing gear 10 is rotated (270°-0°) under drive of the rack 12, and the code controlling chip 9 generates a new code according to the inputted code.

As shown in FIGS. 8 and 9, the anti-crack steel code sheet is a movable sheet 15 provided under the keys, as described before, therefore it can be moved as the rotation of the lock handle knob 3. Thus, when the knob rotates to a certain degree, the movable sheet 15 automatically locks the individual keys. The action principles are illustrated as comprising the following:

I) When the knob 3 is not rotated, each key can be pressed down freely through the key holes 151 on the movable sheet 15;

II) When the knob 3 is rotated by external force, the cylinder 16 (i.e. the knob button) also rotates with the handle, thus pushing the anti-crack steel code sheet forward;

III) When the handle knob 3 is rotated to a certain degree, the anti-crack steel code sheet moves to dis-align the key holes with the respective keys.

Therefore, when a key is pressed down again, the key cannot get through the lock groove 152 since being blocked by the anti-crack steel code sheet, thus the code cannot be reset.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A code changing mechanism for a mechanical combination lock, comprising:

a plurality of function keys and two rows of code number keys provided on a combination lock body, wherein the plurality of function keys comprises a reset key;

a code changing rack, an intermediate gear, a code changing lock core provided with a code changing keyhole, and each of the code number keys being connected to an individual code changing gear module, wherein each individual code changing gear module comprises:

a code changing gear and a code controlling chip having two sides;

a groove for resetting the code is provided on the code changing gear;

the code controlling chip inserted in the groove to form a code reset site, and a code free site is provided between the code controlling chip and the code changing gear;

a left straight rack having a left tip opposing a right straight rack having a right tip, are arranged on the code changing rack, and the left straight rack and the right straight rack engage with a corresponding row of code changing gears, respectively; wherein the code changing lock core coaxially connects with the intermediate gear, and the intermediate gear engages with two opposing code changing gears thereof.

2. The code changing mechanism for a mechanical combination lock according to claim 1, wherein for every code changing gear module, each code changing gear is formed as a whole by a gear and a plurality of coaxial cylinders, the plurality of cylinders connected to at least one end surface of the gear, and a stepped coaxial hole is provided on the code changing gear;

said groove is provided on one of the plurality of cylinders at one end of the code changing gear;

a barrel-shaped stepped rotary shaft is coaxially provided in the stepped coaxial hole, and a slot is provided on the stepped rotary shaft at one end corresponding to the groove, a width of the groove equals to a width of the slot on the stepped rotary shaft;

an upper protrusion and a lower protrusion spaced a distance apart from each other are provided on each of the two sides of every code controlling chip, and a thickness of the upper protrusion and a thickness of the lower protrusion on each of the two sides are smaller than the width of the groove; and one code controlling chip is installed in a cavity of the stepped rotary shaft, and the lower protrusion on each of the two sides of the code controlling chip are configured for insertion into the groove.

3. The code changing mechanism for a mechanical combination lock according to claim 1, further comprising: a movable anti-crack steel code sheet provided under the plurality of function keys and the two rows of code number keys, wherein a plurality of key holes are provided on the movable steel sheet, each key hole of the plurality of key holes corresponding to a respective function key or code number key, and each key hole of the plurality of key holes is communicatively connected with a locking groove, a width of the locking groove is smaller than a width of each code number key from the two rows of code number keys; and individual key holes are connected to form at least one row via a corresponding locking groove, and the steel sheet is movable.

4. The code changing mechanism for a mechanical combination lock according to claim 2, further comprising: a movable anti-crack steel code sheet provided under the plurality of function keys and the two rows of code number keys, wherein a plurality of key holes are provided on the movable steel sheet, each key hole of the plurality of key holes corresponding to a respective function key or code number key, and each key hole of the plurality of key holes is communicatively connected with a locking groove, a width of the locking groove is smaller than a width of each code number key from the two rows of code number keys; and individual key holes are connected to form at least one row via a corresponding locking groove, and the steel sheet is movable.

* * * * *